United States Patent
Fielding et al.

(10) Patent No.: US 8,343,310 B2
(45) Date of Patent: Jan. 1, 2013

(54) WASTEWATER TREATMENT SYSTEM AND METHOD

(76) Inventors: Ian Fielding, Niagara Falls (CA); John Moriarty, Moonstone (CA)

( * ) Notice: Subject to any disclaimer, the term of this patent is extended or adjusted under 35 U.S.C. 154(b) by 838 days.

(21) Appl. No.: 11/866,421

(22) Filed: Oct. 3, 2007

(65) Prior Publication Data
US 2009/0090473 A1  Apr. 9, 2009

(51) Int. Cl.
*B01D 1/00* (2006.01)
*C02F 1/04* (2006.01)

(52) U.S. Cl. ......... 159/47.3; 159/44; 159/46; 159/901; 159/905; 203/10; 203/21; 203/98; 210/170.08; 210/774; 210/805

(58) Field of Classification Search .......... 159/44, 159/46, 47.3, 901, 905; 203/1, 10, 21, 98; 210/170.03, 170.08, 170.11, 194, 712, 774, 210/805
See application file for complete search history.

(56) References Cited

U.S. PATENT DOCUMENTS

| | | | |
|---|---|---|---|
| RE26,352 E * | 2/1968 | Greenfield | 159/13 |
| 3,635,276 A * | 1/1972 | Green et al. | 159/29 |
| 3,729,042 A * | 4/1973 | Burnett | 159/2.1 |
| 3,947,327 A * | 3/1976 | Greenfield et al. | 203/7 |
| 4,007,094 A * | 2/1977 | Greenfield et al. | 202/174 |
| 4,097,378 A * | 6/1978 | St. Clair | 210/770 |
| 4,315,822 A * | 2/1982 | Jaisinghani | 210/794 |
| 4,702,798 A * | 10/1987 | Bonanno | 159/47.1 |
| 5,076,895 A * | 12/1991 | Greenfield et al. | 203/10 |
| 5,077,071 A * | 12/1991 | Strop | 426/417 |
| 5,968,370 A * | 10/1999 | Trim | 210/723 |
| 6,835,307 B2 * | 12/2004 | Talbert et al. | 210/175 |
| 2005/0045228 A1* | 3/2005 | Labrador | 137/357 |
| 2005/0247571 A1* | 11/2005 | Grigg | 205/743 |

FOREIGN PATENT DOCUMENTS

GB  2 398 069  *  8/2004

\* cited by examiner

*Primary Examiner* — Virginia Manoharan
(74) *Attorney, Agent, or Firm* — Etienne de Villiers; Dimock Stratton LLP

(57) ABSTRACT

A vessel-based system and method for disposing of wastewater including bilge water from a bilge of the vessel. The system including a treatment unit for receiving and treating the wastewater to produce a substantially oil-free treated water and, an evaporator for receiving the treated water from the treatment unit. In an embodiment, the evaporator having an evaporation element for transferring heat to the treated water to evaporate the treated water.

6 Claims, 13 Drawing Sheets

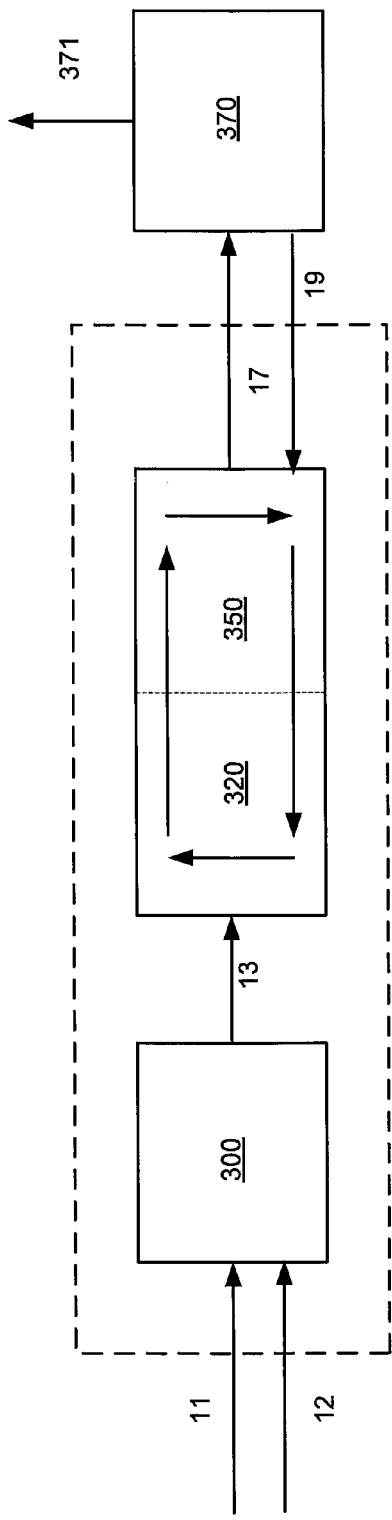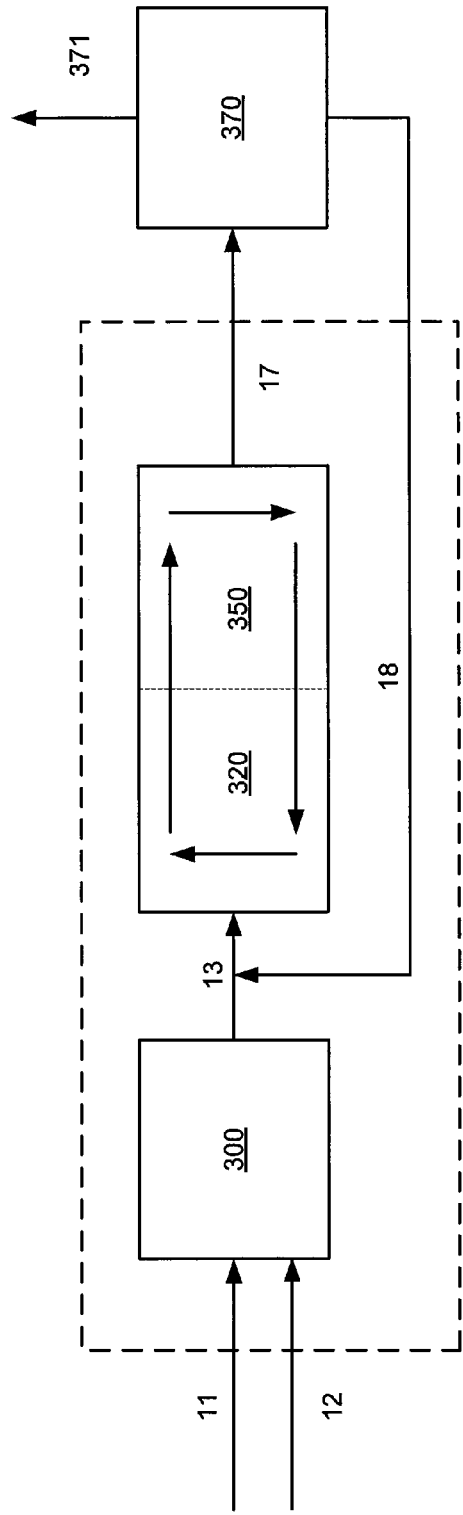

WASTEWATER TREATMENT SYSTEM AND METHOD

BACKGROUND OF THE INVENTION

The present invention relates to a system and method for disposing of wastewater in marine vessels in an environmentally friendly manner. The present invention also relates to a system and method for maintaining a bilge of marine vessel relatively free of an accumulation of oil. The present invention further relates to a system and method for separating oil and other contaminants from wastewater, to produce relatively clean process water. The present invention further relates to a system and method for disposing of wastewater in a vessel, including bilge water.

The treatment and disposal of wastewater, and in particular, contaminated wastewater, has proven to be a difficult task to perform and enforce in practice. While this is true in the average case, it is particularly true for the treatment of contaminated wastewater produced on transportation vessels such as marine vessels.

A marine vessel, when in operation produces large quantities of wastewater that must be treated and/or stored until the vessel reaches port. The alternative is for the vessel to dispose of the wastewater overboard and into the body of water through which it is travelling.

Marine vessel wastewater can be divided into broad categories. The first results from human activity on board the vessel and includes "sewage" and "grey water". Grey water is typically understood to be wastewater produced as a result of cooking, cleaning, washing and other personal activities. The second category of wastewater on a marine vessel is typically understood to be "bilge water" which includes liquids and particulates that accumulate in the bilge as a result of activities relating to the operation and maintenance of a vessel.

Bilge water constitutes all water that makes its way into the bilge of the vessel. Water can find its way into the bilge in a number of fashions, including water from leaking pipes, valves and pumps, water that may enter the engine room from the propeller tail shaft, water leaks from equipment located in the engine room, process water used to wash the engine room and other industrial areas of the marine vessel, turbid or brackish water drawn onboard from ports and harbours and even some grey water, all of which may find its way into the bilge. The resulting accumulation of water in the bilge is typically contaminated with lubricating oil, fuel oil and other debris from the engine room.

The engine room bilge on marine vessels serves as a catch all or dump for all of the water, lubricating or hydraulic oils, fuel oil (heavy and diesel), cleaning additives such as soap, degreasers, mop water and any other liquids or waste water that may be spilled in the engine room or machinery spaces of the vessels. Added to this water is other detritus including: dirt, dust and other particulate from the atmosphere; dust, spoils and other residues from cargo handling operations; and carbon and other residue accruing from the cleaning of machinery and equipment. It is not uncommon to find cleaning rags, filings, paint chips, rust and scale in a vessel's bilge. The resulting mixture may be called "bilge water", a particularly contaminated form of industrial wastewater.

Marine wastewater accumulating in the bilge has different characteristics depending upon its contents at any given time. Typically, in periods when there is a significant accumulation of water and contamination within the bilge, oil will float on top of the water surface as it has a lighter specific gravity. Mixed with the oil on top of the water will be lighter solids, soaps, degreasers, and other chemicals to form an emulsified mixture within the top layer of water. The remaining portion of the bilge water below the surface is typically water and any heavier solids. Typically, the heavier solids and particulates do not remain in suspension and settle out to the bottom of the bilge.

Accordingly, the contents of the bilge may be generalised as consisting of three layers: an "upper layer" comprised mostly of oils and other liquids having a specific gravity lighter than water; a "bottom layer" comprised mostly of solids and sediment consisting of saturated particulates; and a "middle layer" comprised mostly of water and fine particulates held in suspension. In relative terms the "middle layer" is often referred to as the "clean water layer", as in comparison to the other layers it comprises a smaller fraction of oil and particulate, though it is not sufficiently "clean" as to be potable or directly discharged into the environment. This generalisation is understood to be for descriptive purposes and it should be understood that the layers are not homogeneous and typically consist of varying proportions of all the contents of the bilge.

The standard practice in dealing with such contaminated water has been to simply pump, collected from the "middle layer" and below the "upper layer", water from the bilge that is presumed to have a lower content of oil and other contaminants. This "clean water" component of the bilge is passed through oil traps such as filters or scrubbers prior to discharge over the side of the vessel.

In order to meet various environmental regulations, which until recently have focused mostly on the oil content of wastewater to be discharged overboard from marine vessels, a meter (known in the marine industry as an "oil content meter") must, in accordance with the International Maritime Organization's requirements, be installed on the discharge line from the bilge. The purpose of the oil content meter is to ensure that any water discharged from the vessel does not contain more than the maximum amount of oil permitted to be discharged with the water, measured in parts per million. Generally, these meters have a reputation of unreliability. In practise, they merely confirm the clarity of the water to be discharged and may be defeated by diluting the concentration of the wastewater with additional water from other sources.

In practical terms, oil content meters have been found to be unreliable for two reasons. First, they are subject to fouling due to normal operating conditions onboard the vessel and periodically malfunction as a result. Second, the meters are often incapable of distinguishing the various contaminants that may be present in the water. The typical oil content meter triggers an alarm based on a reading of the turbidity of the water to be discharged. If the reading is high, the meter presumes that the water to be discharged contains oil in an amount that exceeds permissible levels and discharge operations are stopped, the water is directed back to the bilge and an alarm signals the crew. However, contaminants other than oil, such as turbid or brackish water drawn onboard in the course of normal operations, cleaning fluids, soaps, dust, dirt, rust, salts, dissolved minerals and other particulates also affect turbidity. Often, the presence of "non oil contaminants" in the discharge line causes the oil content meter to trigger a "false reading" with respect to oil content in the water and discharge operations are stopped as a result.

To overcome these operational deficiencies, the practical reality is that many vessels attempt to defeat the operation of the oil content meter. Although it is illegal to do so, there several ways to circumvent the oil content meter. One is simply to divert water through another line that bypasses the meter. Another is by allowing or injecting additional water into the discharge stream, up-stream from the meter. The effect of the introduction or injection of additional water into the discharge stream is to reduce the concentration of any contaminants in the wastewater. Further, if the oil content meter malfunctions, there is no other automated system onboard that prevents the discharge of contaminated water overboard. As a result, the monitored restriction and management of the overboard discharge of wastewater, based on the use of oil content meters, has proven largely ineffective at ensuring compliance with environmental regulations.

An additional problem with these existing systems is that by allowing for continual discharge of wastewater over the side of a vessel, the bilge effectively becomes a repository of higher and higher concentrations of oil and other contaminants. This is as a result of consistently siphoning off the "clean water layer" from the bilge, thus allowing the oil and other contaminants on the "upper layer" of the bilge water to remain and expand. The net result is a bilge that grows dirtier and dirtier with time and comprises an ever increasing proportion of oil in the bilge.

Environmental regulations have been enacted around the world in recognition of the fact that marine wastewater is particularly harmful to the environment.

In prior art systems for dealing with bilge water, the system typically relies on elements such as a decant tank, as well as, polishing media such as filters and other scrubbers to remove the oil content from the bilge water that is siphoned from the bilge. While such media can be effective at removing bulk quantities of oil from wastewater, they suffer from several disadvantages within the context of a continually operating system.

First, media such as filters and scrubbers become clogged with time and require replacement or cleaning. For applications such as marine vessels, often there may not be spare parts available for replacement when a ship arrives at port. In the result, the system may be rendered inoperable or ineffective. Further, the spent filters and scrubbers must be stored onboard until the vessel reaches port and, in themselves, constitute hazardous or contaminated waste materials dangerous to the environment. Second, a filter or scrubber may break while the vessel is in transit, resulting in the wastewater system being unable to remove oil and contaminants from bilge water prior to discharge over the side. The system may be rendered inoperable or ineffective until the vessel reaches port, assuming that replacement parts are available and can be installed in a timely fashion. Third, while such systems are capable of removing oil from bilge water by trapping and holding it in a filter, they are of marginal utility for the purpose of capturing, recovering and storing oil for re-cycled use. Fourth, such systems typically remove water from the vessel's bilge, filter it and discharge it off the vessel, the sole practical purpose being to restore the holding capacity of the bilge. The bilge water removed is neither treated nor re-cycled for any other operational use onboard the vessel. While these shortcomings have been recognized for many years, to date there has been no practical solution for dealing with wastewater from the bilges.

Referring to FIG. 1a, a prior art method of handling bilge water is depicted. A bilge 100 may be generally described as a catch-all for wastewater free in a vessel. As a result of the catch-all nature, a bilge 100 typically comprises a bottom layer of heavy particles and sediment 505, a middle layer of water and fine particulate 510 and an upper layer of oil 515. In prior art bilge systems a bilge water intake 21 is typically provided just above (such as 6") the bottom layer 505 of the bilge 100. The intake 21 is located to minimize the intake of sediment from the bottom layer 505 of the bilge 100, and avoid drawing oily water from the upper layer 515 of the bilge 100.

A hi-level bilge sensor 22 and low-level bilge sensor 23 are provided to control the operation of a pump 205. The pump 205 draws bilge water from the bilge 100 through bilge water intake 21, and directs it through an oil trap 24 before discharging the bilge water overboard. Water separated in the oil trap may be diverted to an oil store 26 such as a sludge tank.

Prior bilge wastewater handling systems of this type generally relied upon an oil trap 24 that operated by gravitational settlement or filtration. Since these methods take time and are not well-suited to operating on large volumes of liquid, the bilge water intake 21 was necessarily located below the low-level sensor 23 in an attempt to draw water from only the middle layer 510 in the bilge 100 and avoid drawing oily water from the upper layer 515. Accordingly, the pump 205 is only energized when a sufficient amount of water has collected in the bilge 100 to locate the intake 21 in the middle layer 510.

In order to comply with environmental regulations, a detector 25 monitors the condition of the water exiting the oil trap 24. Typically, the detector 25 detects a level of turbidity in the water leaving the oil trap 24 to ensure the concentration of oil in the water is below acceptable limits. If the turbidity is too high, the water is directed back into the bilge 100 and an alarm condition is initiated to indicate that maintenance of the oil trap 24 is required.

Common problems with this arrangement are that other contaminants in the water, such as soap, sediment or other particulate will also trip the detector 25 even when the level of oil is within acceptable limits. As a result it is a common practice (though illegal) in the shipping industry to operate the bilge discharge by adding additional fresh water to the bilge discharge in order to maintain a low turbidity discharge through the detector 25.

Typical oil traps 24 consist of absorbent material, specific gravity traps, or other filters to remove oil from the bilge water extracted from the bilge 100. Since, the oil traps 24 commonly used are unable to handle large amounts of oil, preferably the intake 21 extracts liquid only from the middle layer 510, for discharge overboard. Referring to FIGS. 2a-2c an illustration of the effect of removing liquid from the middle layer 510 is illustrated. FIG. 2a illustrates a level of the bilge and the three layers described above. In FIG. 2b, the level of the bilge has risen above the high-level sensor 22 and pumping is performed. Over time and multiple pumping cycles, FIG. 2c results with a build-up of oil in the upper layer 515 in the bilge 100. After repeated cycles, the level of oil in the upper layer 515 has built up to such an extent that the oil in the upper layer 515 is close to the intake 21 when the liquid surface 516 is above the low-level sensor 23 and near the high-level sensor 22, and the ship must put into shore for clean-up of the bilge 100.

The build-up of oil in this manner is dangerous and results in a bilge 100 that is an environmental and personal hazard to the vessel's crew. Due to the oil build-up over time clean-up is generally time consuming, and results in the vessel being held up in port for maintenance. If the build-up escapes from the bilge 100 it may cause damage to the environment and depending on the laws and regulations in the jurisdiction having authority, expose the vessel's operators and/or owners to significant penalties including environmental fines, civil claims for damages, criminal convictions and/or incarceration.

Among other problems with this system, the retention of oil leads to a messy bilge environment that can pose both a fire and an environmental risk. This condition also makes it difficult to detect and repair "fresh" leaks of oil, fuel and lubricants from equipment located in the engine room. Furthermore, recent proposed environmental legislation reflects a developing "zero tolerance" policy regarding discharges not only of bilge water from the bilge 100, but also of wastewater of any description from other sources onboard including effluent, grey water and blow down of water containing chemicals. Meeting this standard is not possible using current techniques.

FIG. 1b is a prior art proposed solution for disposing of vessel bilge water. Bilge water is extracted from below the surface of the liquid at an intake 21 and passed through an oil trap 24 and the oily waste is directed to oil storage 26. The treated bilge water is then either discharged overboard or injected (sprayed) at an injection point 32 inside an exhaust stack 31 of the vessel's engine 30 directly into the exhaust stream 33 for flash vaporisation.

Aside from the practical difficulties with injecting large amounts of water into an engine exhaust stack 31, the solution suffers from the drawback that water may only be vaporised when the vessel is operating at full throttle, with the engine 30 at full pressure and with an exhaust stack 31 temperature over 500° F. Accordingly the solution is not practical for zero-discharge operation: while in stationary or in port, while the vessel is in transit at less than full throttle, or for disposing of large quantities of bilge water.

In practical terms, the solution also suffers from other significant operational shortcomings. First, since the solution requires extreme temperatures to achieve flash vaporization, the rate of water that may be injected into the stack 31 is limited as the injection of cold water into the exhaust stack 31 reduces the ambient temperature of the exhaust gases 33. Second, especially if the ambient temperature falls below 500° F., there is a danger that any particulate introduced into the stack 31 and any steam generated by the injection process may not be fully exhausted up and out the stack 31. If this happens, gravity will cause the residue to fall into the engine 30. Third, the resulting increased humidity in the exhaust gases 33 may lead to increased corrosion of the stack 31.

There thus arises a need for a system and method for handling wastewater from bilges that overcomes the limitations of the prior art. There also arises a need for a system and method that is capable of handling wastewater from bilges that can operate in the current climate of ever increasing environmental regulations. There further arises a need for a wastewater management handling system and method that can achieve zero discharge into the bodies of water on which the vessel travels.

BRIEF DESCRIPTION OF THE DRAWINGS

In drawings which illustrate by way of example only a preferred embodiment of the invention.

FIGS. 6a and 6b illustrate embodiments of a method of disposing of treated waste water.

DETAILED DESCRIPTION OF THE INVENTION

Figure 1A:
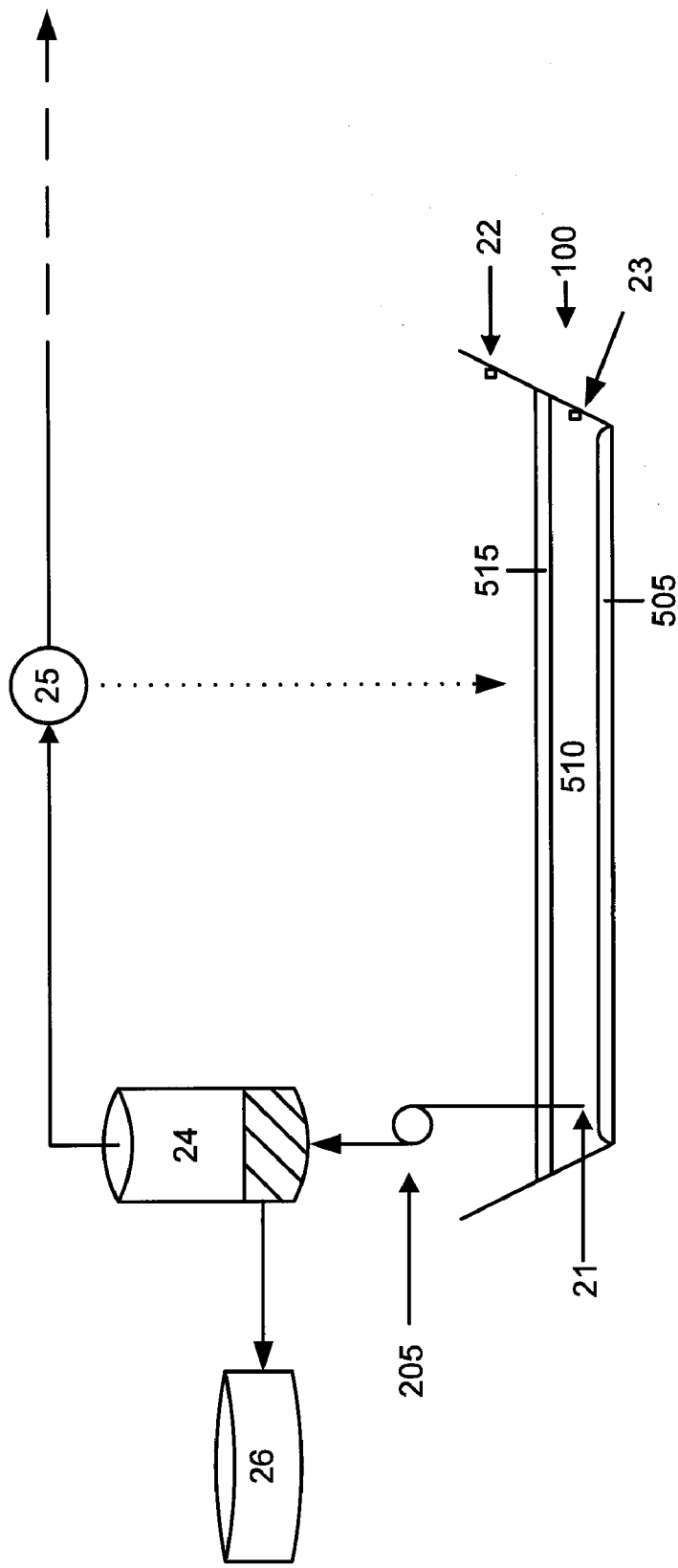
FIGS. 1a and 1b are prior art systems for disposing of vessel waste water.
Figure 1B:
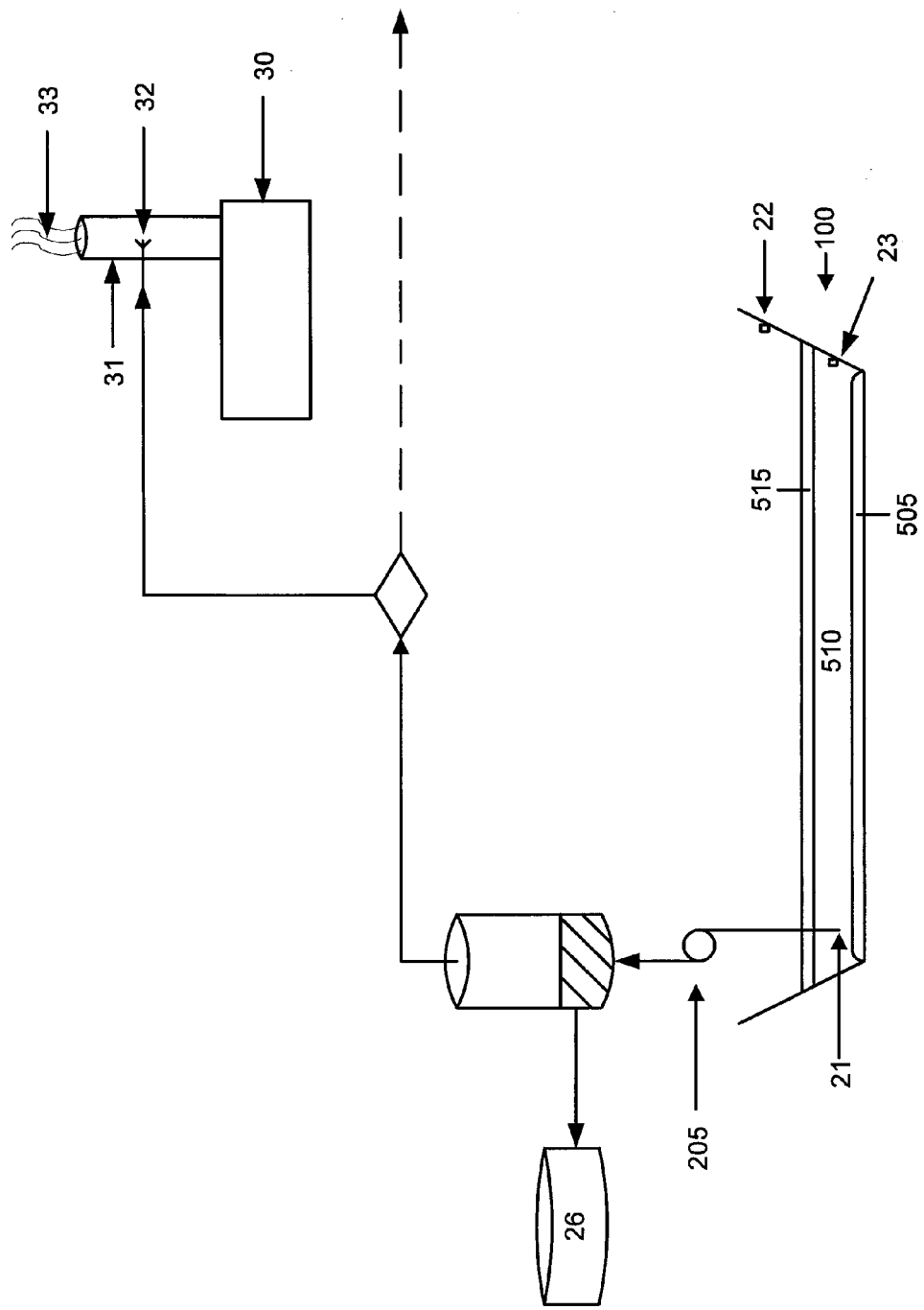
Figure 2A:
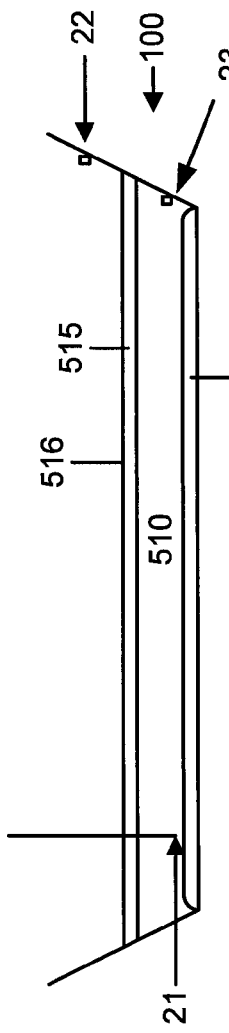
FIGS. 2a, 2b and 2c illustrate the contents of a bilge of a vessel using a prior art disposal system.
Figure 2B:
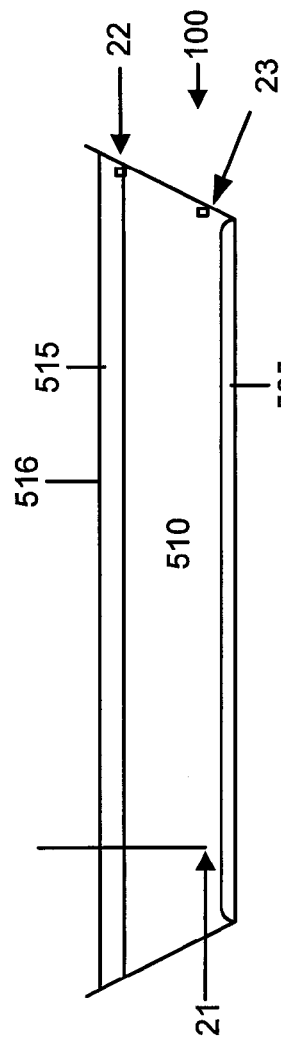
Figure 2C:
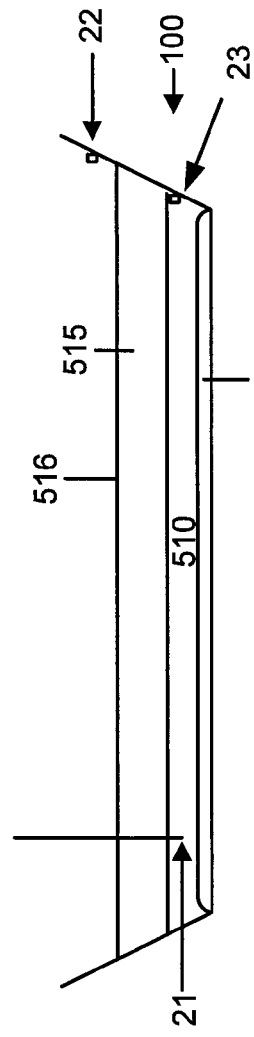

The present invention provides for a system and method for handling wastewater from bilges and other wastewater sources onboard marine vessels. The present invention also provides for handling bilge water to minimize and reduce the accumulation of oil within the bilge. The present invention further provides for a system and method for disposing of wastewater in an environmentally friendly manner and that in a preferred embodiment may occur with zero discharge of onboard contaminated water into a body of water.

There is provided a method for disposing of vessel wastewater comprising: treating the wastewater to produce a treated water; transferring heat delivered by a heat input through an evaporation element to the treated water to produce a heated treated water; and, evaporating the heated treated water.

The treatment may further comprise separating and isolating oil from the wastewater to produce substantially oil-free treated water and a substantially oily waste; and, storing the substantially oily waste in an oil storage container.

The method may further comprise transferring heat from a heating element to the treated water for pre-heating the treated water; and, directing the pre-heated treated water to the evaporation element for evaporation.

Alternatively, the treatment may further comprise separating and isolating oily waste from the wastewater to produce substantially oil-free treated water and storing the separated and isolated oily waste in an oil store; separating and isolating solids from the substantially oil-free treated water to produce a substantially solids-free oil-free treated water and storing the separated and isolated solids; and, evaporating the substantially solids-free oil-free treated water.

There is provided a vessel adapted to handle and dispose of wastewater, the vessel comprising: a hull; a power source for propelling the vessel; a bilge located at the base of the hull for catching liquids that enter the hull, the liquids comprising wastewater in the bilge; a treatment unit for treating the wastewater in the bilge; an evaporator for receiving the treated water from the treatment unit, the evaporator comprising an evaporation element for transferring heat to the treated water; whereby the vessel handles wastewater in the bilge by extracting the wastewater from the bilge, treating the extracted wastewater in the treatment unit, directing the treated water to the evaporator, transferring heat from the evaporation element to the treated water for evaporating the treated water.

The vessel may further comprise an evaporator heat input for extracting waste heat from the vessel and transferring the waste heat to the evaporation element for evaporating the treated water.

The treatment unit of the vessel may further comprise an oil treatment unit for separating and isolating oily waste from the wastewater to produce substantially oil-free treated water; an oil store for receiving and storing the separated and isolated oily waste; a solids treatment unit for separating and isolating solids from the substantially oil-free treated water to produce substantially solids-free oil-free treated water; and, a solids store for receiving and storing the separated and isolated solids; whereby the treatment unit directs the substantially solids-free oil-free treated water to the evaporator and stores the oily waste in the oil store and the solids in the solids store.

The treatment unit of the vessel may further comprise a make-up tank for receiving the substantially solids-free oil-free treated water from the solids treatment unit and directing the substantially solids-free oil-free treated water to the evaporator; and, the make-up tank and the solids treatment unit comprising a circulation circuit for circulating the substantially solids-free oil-free treated water between the make-up tank and the solids treatment unit; whereby the substantially solids-free oil-free treated water produced by the solids treatment unit is stored in the make-up tank and the substantially solids-free oil-free treated water is directed to the evaporator from the make-up tank, and substantially solids-free oil-free treated water is circulated between the make-up tank and the solids treatment unit to further remove solids.

There is provided a vessel-based system for disposing of wastewater including bilge water from a bilge of the vessel, the system comprising: a treatment unit for receiving and treating the wastewater to produce a substantially oil-free treated water; and, an evaporator for receiving the treated water from the treatment unit, the evaporator comprising an evaporation element for transferring heat to the treated water for evaporating the treated water.

The treatment unit of the system may further comprise an oil treatment unit for separating and isolating oily waste from the wastewater to produce substantially oil-free treated water; an oil store for receiving and storing the separated and isolated oily waste; a solids treatment unit for separating and isolating solids from the substantially oil-free treated water to produce substantially solids-free oil-free treated water; and, a solids store for receiving and storing the separated and isolated solids; whereby the treatment unit directs the substantially solids-free oil-free treated water to the evaporator and stores the oily waste in the oil store and the solids in the solids store.

Figure 3A:
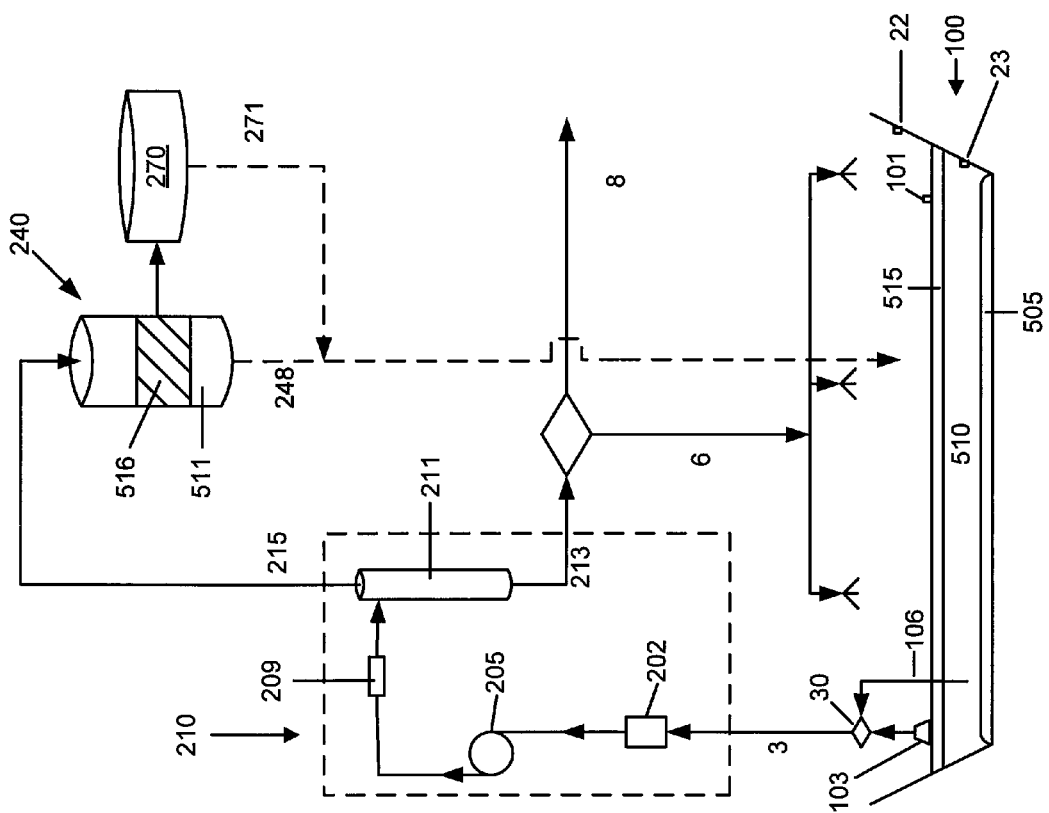
FIGS. 3a and 3b illustrate an embodiment of a bilge water treatment system and method.

FIG. 3a illustrates an improved continuous clean bilge system and method as proposed by the inventors. The use of such a continuous clean bilge system is a preferred system and method for maintaining a clean bilge and supplying supply of wastewater for disposal by the system and method described below. It will be appreciated that other methods of extracting wastewater from a bilge may also be compatible with the disposal method.

One or more skimmers 103 extract oily bilge water from the top layer 515. The clean bilge system targets the oily upper layer 515 for extraction. Preferably a low-level intake 106 is also provided if the bilge water level reaches a high-level in the bilge 100. The level of the bilge water may be detected by a combination of sensors such as a low-level sensor 23, a high level sensor 22 and/or a floating sensor 101.

The continuous clean bilge system operates by pumping the oily bilge water through an oil treatment unit 210 comprising a strainer 202, an oil-water separator 211, such as a cyclonic separator, and optionally an electronic water treatment unit 209. The oil-water separator 211 receives an input stream and outputs a substantially water stream and a substantially oil stream (oily stream). A suitable electronic water treatment unit 209 is available from Griswold Filtration (www.griswoldfiltration.com), and is called a Scale Bacterial Corrosion Controller (SBC). The purpose of the electronic water treatment unit 209 is to reduce build-up of bio-film and scale on the inside of the system's pipes and components, as well as to reduce the risk of bacteria contamination of the bilge 100. An advantage of the electronic water treatment unit 209 is its ability to process a continuous flow of untreated liquid with minimal maintenance and power requirements. While use of an electronic water treatment unit 209 in the system is not a requirement, it is a useful addition that reduces the maintenance requirements on an ongoing basis and may facilitate the removal of oil through the separator 211.

As will be appreciated, the pump 205 could be located at other locations in the system, but positioning the pump 205 directly after the strainer 202 is preferred. An oil-water separator 211, unlike an oil trap 24, is able to process a continuous flow and is able to operate with concentrations of oil and volumes of liquid that would defeat an oil trap 24. The separated oily stream 215 is directed to a decant tank 240 for decanted separation into an oil layer 516 and a water layer 511. The oil layer 516 may be directed to an oil store 270 and the water layer 511 periodically drained to the bilge through a drain 248. Typically the oil store 270 will include an overflow 271 that connects through drain 248 to use the bilge 100 as an emergency reservoir should the oil store 270 overflow.

The treated water stream 213 may be continuously re-cycled to the bilge 100 by redirection through a directional valve to line 6 to flush the bilge 100 and be re-treated. The treated water stream 213 may alternatively be directed through the same directional valve to line 8 for disposal. Preferably a series of water outlets are distributed throughout the bilge 100 to provide a flushing action to wash down the bilge 100 before uptake from the skimmers 103. Preferably, the flushing action may be effectuated by circulating a flow of water along a perimeter of the bilge 100. The system may re-circulate water drawn in by the skimmers 103 through the separator 211 and back into the bilge to capture and remove contaminant in the bilge 100. In this manner the continuous clean bilge system continuously or periodically flushes the bilge with water treated by the oil-water separator 211 to flush the bilge 100 and capture any oil in the bilge 100 in the oil store 270 where it can be disposed of or re-cycled for other uses such as fuel to power boilers or heaters.

Figure 3B:
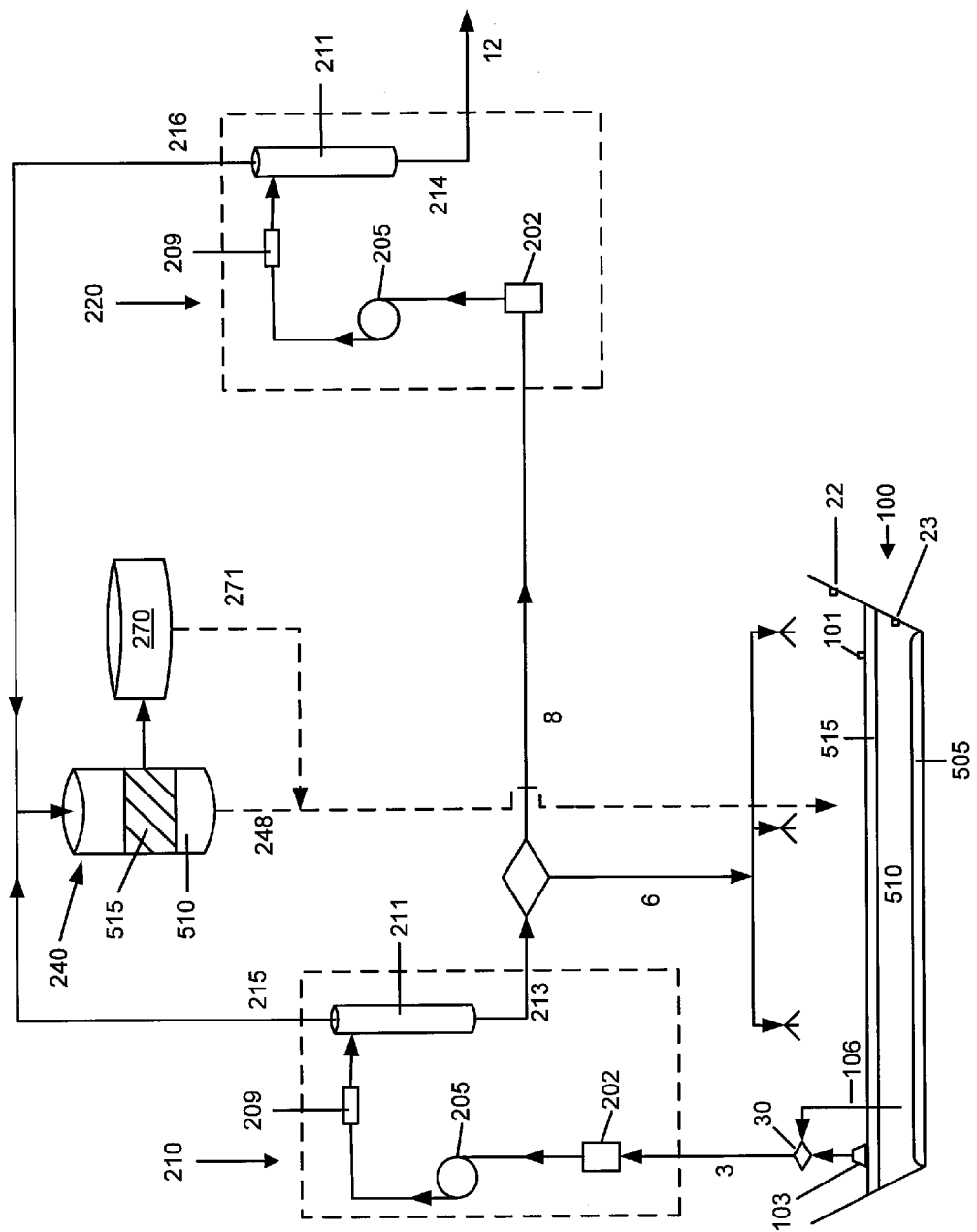

FIG. 3b illustrates an embodiment that includes a secondary oil treatment unit 220 to re-treat the treated water discharged through line 8. Use of a secondary oil treatment unit 220 is not required, but is useful to provide a closed oil separation circuit comprising the primary oil treatment unit 210 for flushing of the bilge 100 and a treated water stream 214 out line 12 that has a preferred minimal oil content for disposal. Use of a secondary oil treatment unit 220 is also helpful where a failure occurs in the primary oil treatment unit 210, which would otherwise frustrate attempts to flush the bilge 100 or dispose of the bilge water. Preferably, the secondary oil treatment unit 220 may also be connected to line 6 to allow treated water stream 214 to be directed directly back to the bilge 100.

The secondary oil treatment unit 220 may (but need not) include a pump 205, depending upon the requirements of the system. The secondary oil treatment unit 220 may include its own strainer 202, or it may rely on a common strainer 202 with the primary oil treatment unit 210.

Figure 4A:
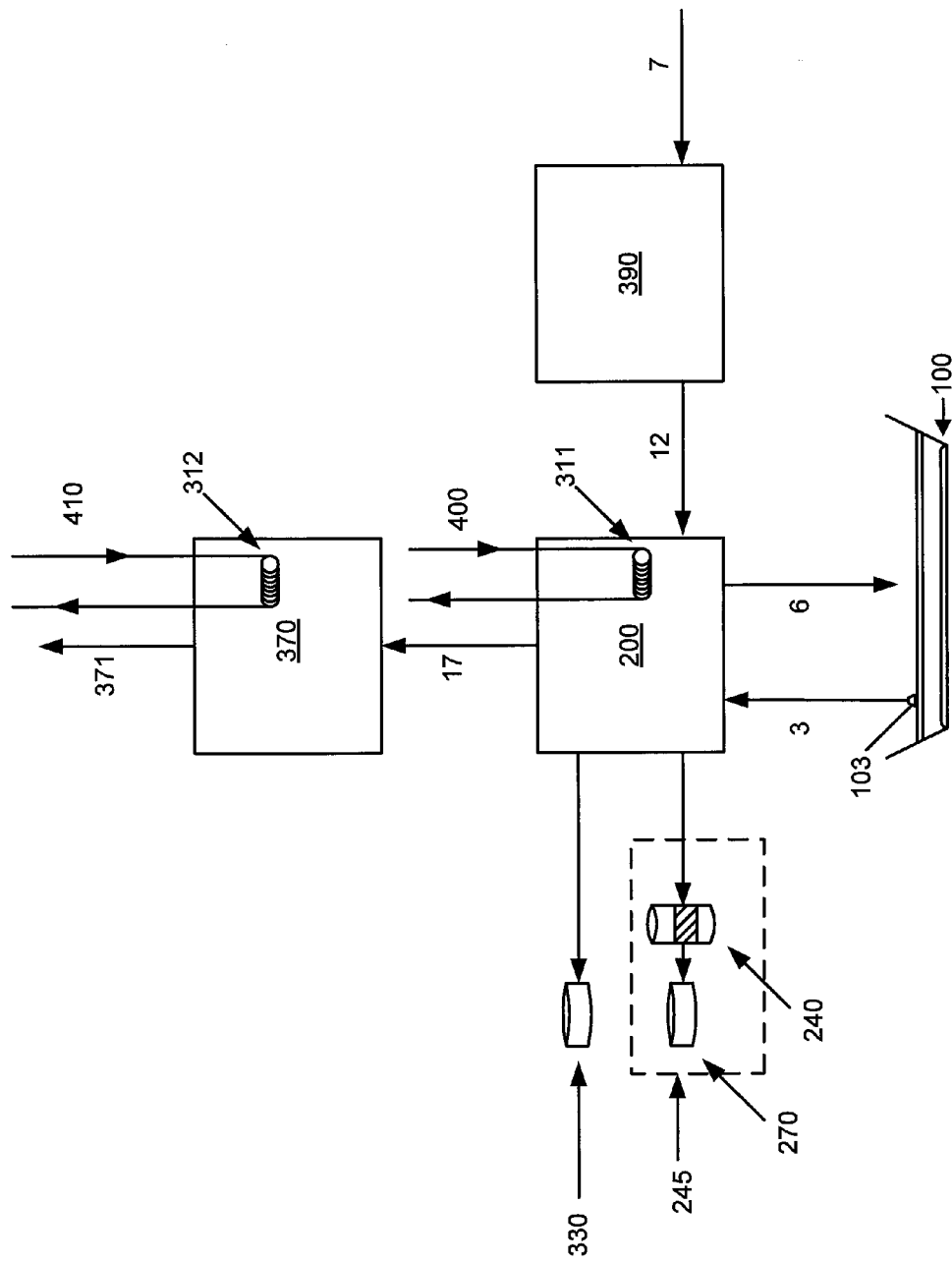
FIGS. 4a, 4b, 4c and 4d illustrate embodiments of a method of handling and disposing of vessel waste water.

FIG. 4a illustrates the general operation of an embodiment of a system and method for disposing of vessel wastewater. Wastewater from a bilge 100 and/or a sewage treatment unit 390 is treated in treatment unit 200. Treated water may be directed to the bilge 100 through line 6 to flush the bilge as described above. Treated water may also be directed out line 17 to evaporator 370 that produces an evaporated output for discharge from the vessel. Preferably sensors monitor the condition of the evaporated output 371 to alert the vessel operator of a possible fault or contaminant in the system.

The evaporator 370 preferably comprises an evaporation element 312 for transferring heat from heat input 410 to the treated water for evaporation. Evaporation element 312 may comprise a coil, heat exchanger, evaporation plate, double wall or other known evaporation means. In an embodiment evaporator 370 may comprise a vessel situated such that at least a wall of the vessel comprises the evaporation element 312 for transferring heat from a heated fluid transported along the wall outside of the vessel to heat the treated water inside the vessel. The heated fluid may comprise a steam line, exhaust gases, or other heat exchange fluid. In an alternate embodiment, evaporation element 312 may comprise a series of pipes transporting a heated fluid through the vessel.

While the figures illustrate the heating element 311 and evaporation element 312 as coils, this is intended solely for illustrative purposes to illustrate an element for transferring heat and not intended to limit the heating element 311 and evaporation element 312 to a coil. Thus, it is understood that other suitable known heat transfer systems may also be used.

The sewage treatment unit 390 is a standard marine sewage treatment unit that accepts grey water and sewage water through line 7, treats the water with sewage treatment methods, separates and traps solids in a store for disposal at a disposal facility and outputs treated sewage water through line 12.

Treatment unit 200 receives treated sewage water and bilge water. Treatment unit 200 treats the received water and outputs oily waste that is directed to an oil store unit 245 comprising a decant tank 240 and oil store 270. Treatment unit 200 also outputs solids for storage in a solids store 330. Solids are typically carried to the solids store 330 with water that is returned to treatment unit 200 (not shown).

Treatment unit 200 outputs treated water through line 17 that is suitable for evaporation in evaporator 370.

Figure 4B:
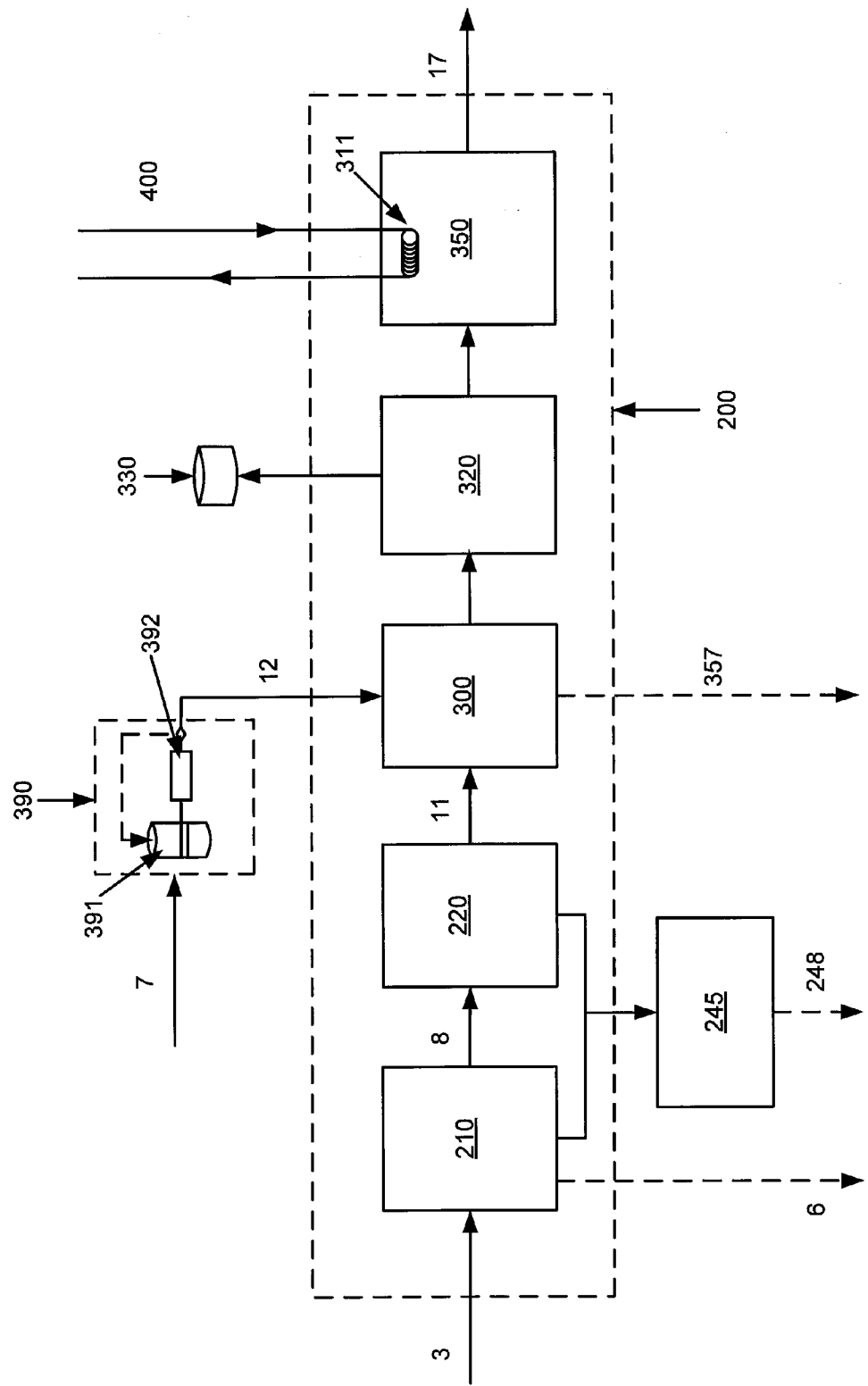
Figure 4C:
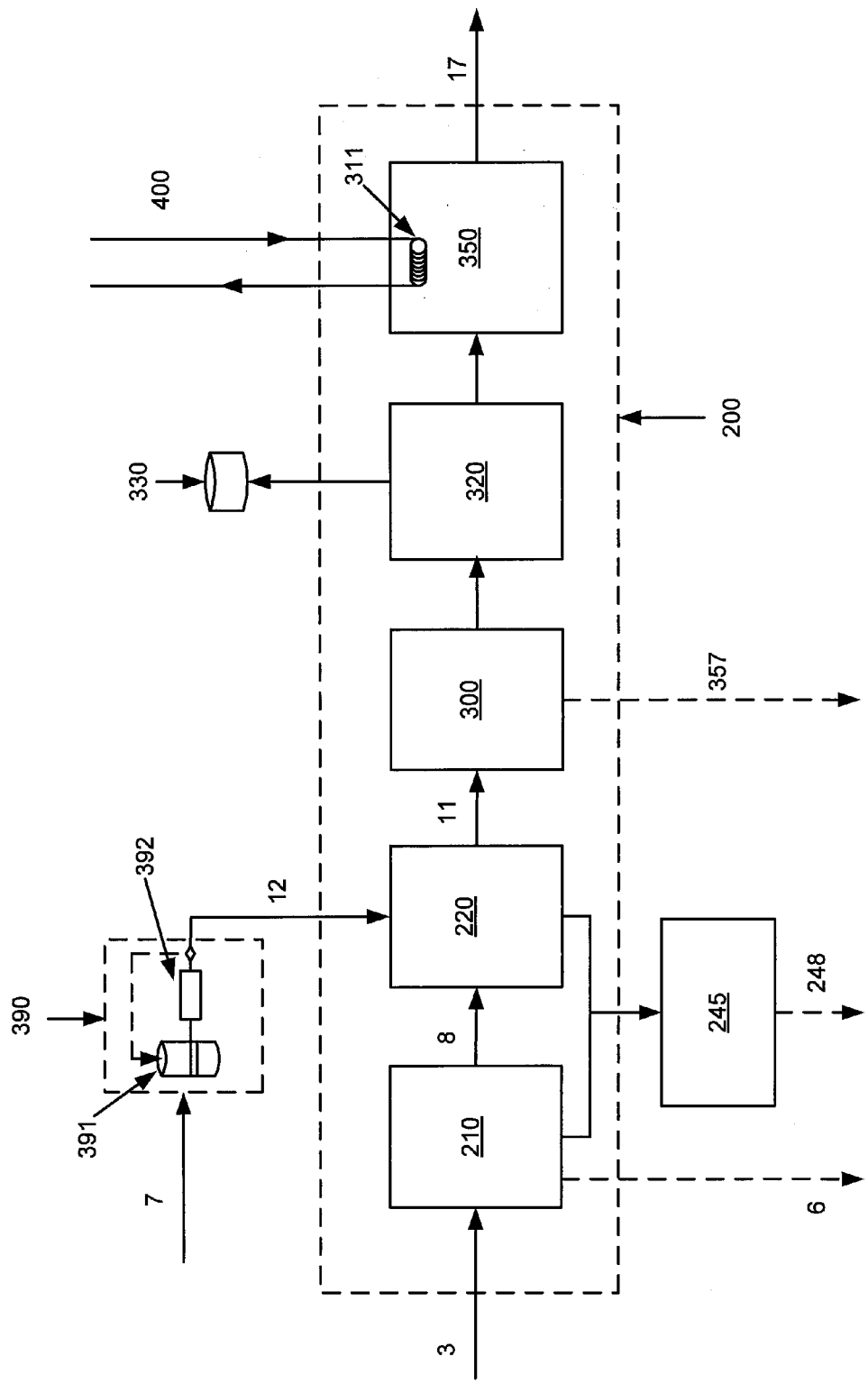
Figure 4D:
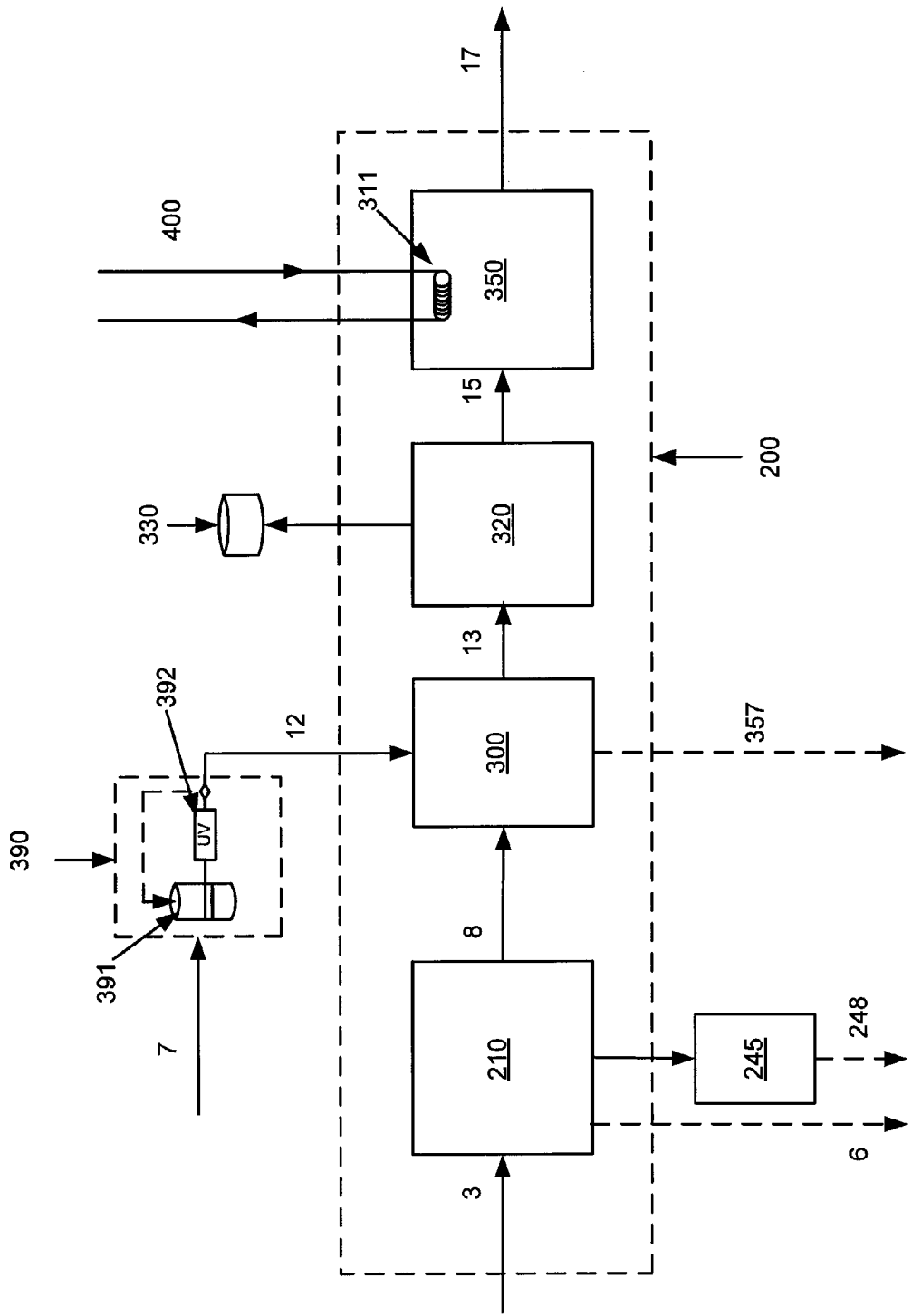

Referring to FIG. 4b, the treatment unit 200 may comprise a primary oil separation unit 210, a secondary oil separation unit 220, a holding tank 300, a solids treatment system 320 and a makeup tank 350. It will be appreciated that the specific components making up treatment unit 200 may vary, provided the unit 200 is able to produce treated water through line 17 for evaporation in evaporator 370. In the embodiment illustrated in FIG. 4b, both a primary oil treatment unit 210 and a secondary oil treatment unit 220 are present. As illustrated in FIG. 4d, treatment unit 200 may alternatively comprise a single oil treatment unit 210.

Referring back to FIG. 4b, oil treatment unit 200 preferably comprises a holding tank 300 for maintaining a store of oil-free water. Holding tank 300 may also be used as an oil-free water reservoir or catch-all to receive oil-free treated water from other components in the system. Preferably the holding tank 300 is connected to the bilge 100 through line 357. Accordingly, the bilge 100 may act as a reservoir or catch-all to receive oil-free treated water that overflows from the holding tank 300.

Holding tank 300 allows for flexibility in the system. For instance, as described above the continuous clean bilge system preferably continuously flushes the bilge 100 and outputs treated water through line 8 as necessary to maintain the level in the bilge 100. Holding tank 300 permits a low level of bilge water to be maintained in the bilge 100, while the collected water is maintained in a treated oil-free state in the holding tank 300. This method reduces the amount of oily water present in the vessel's bilge 100 and accordingly reduces the environmental and health hazards typically present with a vessel's bilge.

The treatment unit 200 illustrated in FIG. 4b includes the treated sewage output from sewage treatment unit 390 output through line 12 into holding tank 300. As will be appreciated, while it is practical to input the treated sewage into the holding tank 300, the treated sewage could also be input at other points in the process. FIG. 4c illustrates the treated sewage being input to secondary oil treatment unit 220.

The treatment unit 200 illustrated in FIG. 4b includes a solids treatment unit 320 that separates solids for storage in solids store 330. The solids-free treated water is output through line 15 to make-up tank 350. Make-up tank 350 is an optional component that may be included to provide a reservoir of solids-free treated water to supply evaporator 370. Make-up tank 350 also acts as a reservoir to receive water from evaporator 370 through line 19 (not shown in this view) during operation to assist in control of the water level in evaporator 370 and maintaining the operating temperature in evaporator 370.

In a preferred arrangement make-up tank 350 further comprises a pre-heater to pre-heat the treated solids-free water prior to output to the evaporator 370. The pre-heater may comprise a heating element 311 fed by a heat input 400. Pre-heating is desirable to maintain efficient operation of the evaporator 370. Referring to FIG. 6a, operation of the arrangement depicted in FIG. 4b is illustrated. Treated oil-free water is input through lines 11 and 12 to the holding tank 300. The treated oil-free water is then output through line 13 through the solids treatment unit 320 to the make-up tank 350. The treated solids-free water is output through line 17 to the evaporator 370 through line 17. The water in evaporator 370 may also be returned to the make-up tank 350 through line 19 to maintain operation of evaporator 370.

Preferably the heat input 400 into make-up tank 350 and the heat input 410 into the evaporator 370 is provided by one or more waste heat sources on the vessel. The heat input 410 to the evaporator 370 is preferably supplied by a large heat source, such as heat transferred from the exhaust of the vessel's main engines and auxiliary engines. The heat input 400 into make-up tank 350 is preferably supplied by a smaller heat source suitable for pre-heating the liquid in make-up tank 350. Examples of common heat sources available on a vessel include coolant feeds from the engines, bunker oil heaters for the bunker fuel, steam return lines, as well as left-over heat from heat input 400. Heat input 400 may be supplied by one or more of these heat sources as is practical on a particular vessel.

Figure 5A:
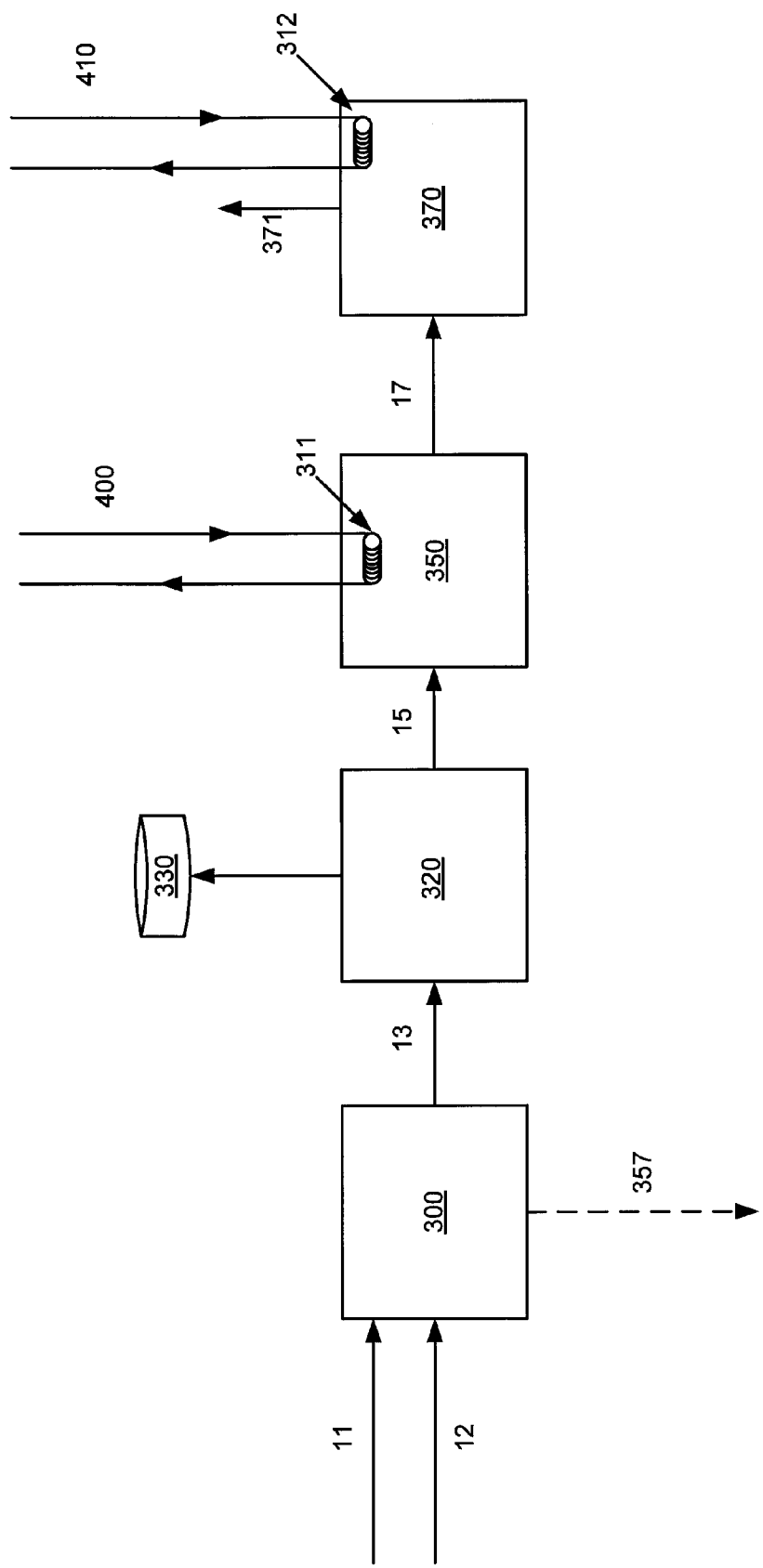
FIGS. 5a and 5b illustrate embodiments of a method of treating and disposing of vessel waste water.

FIG. 5a illustrates the general flow of oil-free treated water for disposal by evaporation 371 in evaporator 370. Oil-free treated water is input through line 11 from the oil treatment units 210 and optionally 220. Treated sewage water is input through line 12 from the sewage treatment unit 390. The substantially oil-free water is held in holding tank 300 before being fed to solids treatment unit 320 through line 13.

Holding tank 300 also includes a return drain line 357 to allow liquid to drain back to the bilge 100 either to assist in flushing the bilge 100, for maintenance, or if there is an overflow in the water treatment unit 200. Solids are separated from the liquid for storage in solids store 330. The solids-free treated water is fed through line 15 to a make-up tank 350. Line 17 supplies evaporator 370 from make-up tank 350.

In the embodiment illustrated in FIG. 5a make-up tank 350 comprises a pre-heater consisting of a heat input 400 that transfers heat to the liquid through heating element 311. Evaporator 370 includes a heat input 410 that transfers heat to the liquid through evaporation element 312. Evaporated water 371 leaves the evaporator 370 through a stack.

Figure 5B:
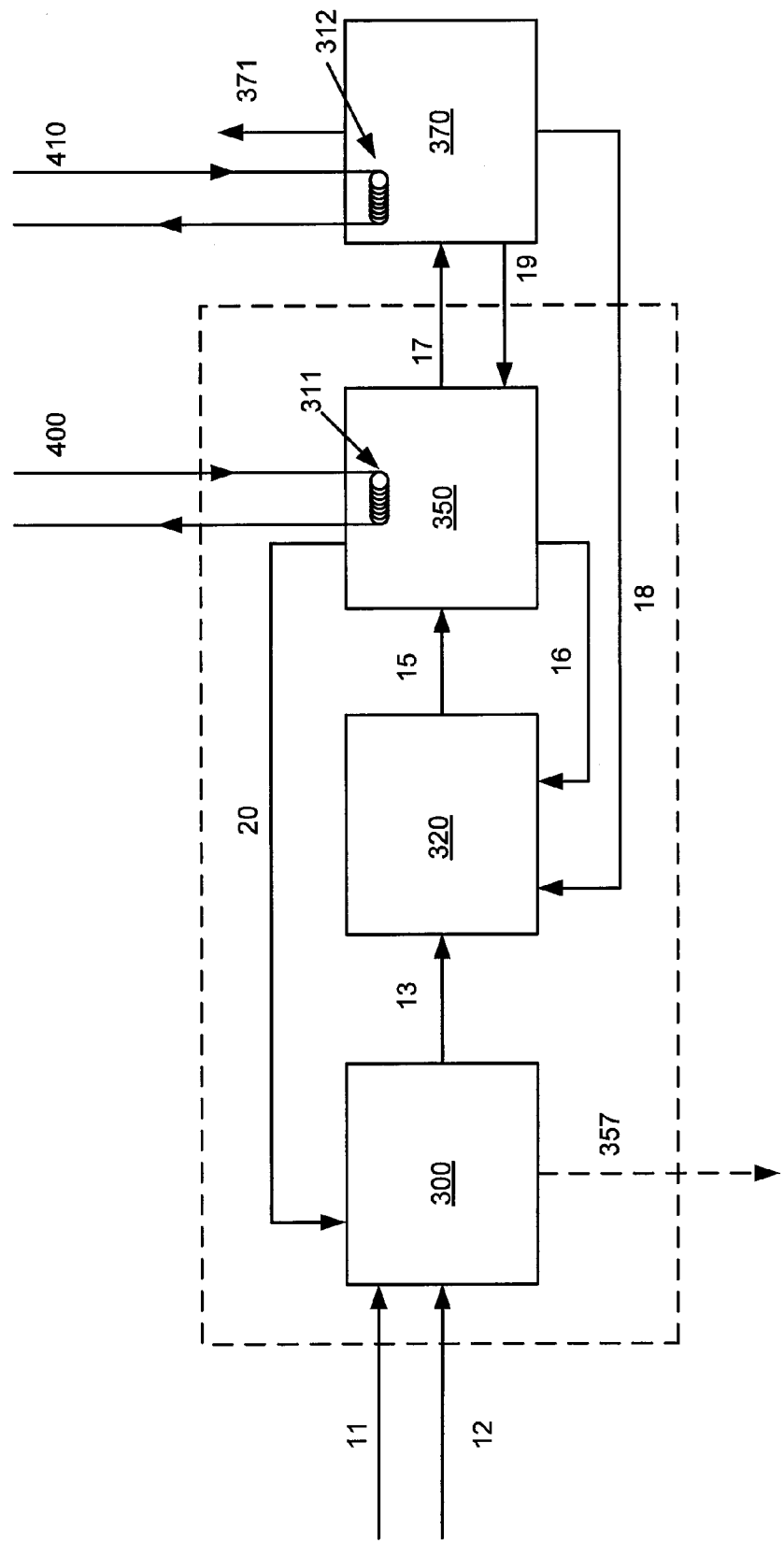

Referring to FIG. 5b, a more complete view of the interconnections between the components of the oil-free section of an embodiment of treatment unit 200 is illustrated. While the general flow of liquid is as depicted in FIG. 5a, several re-circulation lines 16, 18, 19, 20 may be included to assist in operating the unit 200.

Lines 17 and 19 may be used in conjunction with heat input 400 and heat input 410 to regulate the temperature of the liquid in make-up tank 350 and evaporator 370, the rate of evaporation 371, as well as the liquid levels in make-up tank 350 and evaporator 370. Preferably temperature sensors, not shown, are included to assist in monitoring the temperature of the liquid and maintain the evaporator 370 at an optimum temperature range for evaporation 371.

Line 16 may be used for continuous re-circulation of liquid in make-up tank 350 through the solids treatment unit 320. It is useful to use line 16 as is it is practically desirable for operational simplicity to return liquid from evaporator 370 through line 19 to a reservoir such as make-up tank 350, rather than to a treatment unit such as solids treatment unit 320.

Line 18 is provided for crack-down of evaporator 370 as solids are likely to be present when cracking and flushing the evaporator 370. Line 20 is provided to allow drainage of make-up tank 350 to holding tank 300 in case of overflow, or for maintenance. Line 18 may also be used to circulate water in the evaporator 370 through the solids treatment unit 320 based on a conductivity reading in the evaporator 370. A conductivity sensor (not shown) in the evaporator 370 may be used to indicate a conductivity reading that signals the need to circulate water for solids treatment, or effect a full crackdown of the evaporator 370. Lines 17 and 19 may also be used to circulate treated water between the make-up tank 350 and the evaporator 370 to flush solids accumulating in the evaporator 370 for treatment in solids treatment unit 320, depending upon a particular implementation of the system.

The liquid in holding tank 350 may be re-circulated through the solids treatment unit 320 to maintain continuous treatment for solids. The re-circulation is beneficial to avoid build-up of scale in the holding tank 350 and to improve the efficiency of the pre-heating. By providing a re-circulation circuit as depicted in FIGS. 6a and 6b, lines 17 and 19 may be used to control the level of liquid, temperature of the liquid and evaporation rate in evaporator 370 relatively independently of the operation of solids treatment unit 320. Preferably level sensors in holding tank 300, make-up tank 350 and evaporator 370 are monitored and used to coordinate the operation of the treatment unit 200 with the evaporator 370.

Figure 7:
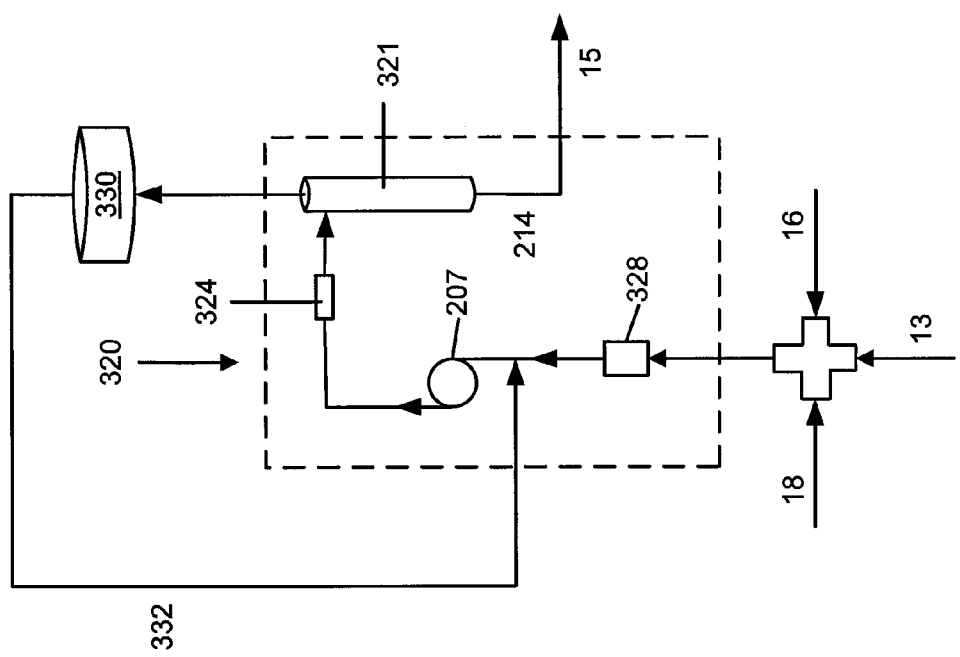
FIG. 7 illustrates an embodiment of a solids treatment unit.

FIG. 7 illustrates an embodiment of the solids treatment unit 320. In the embodiment illustrated water to be treated from lines 13, 16 and 18 converge and is fed through a strainer 328 to remove any large particulate, such as scale, that may be entrained in the flow. The strained liquid may then be pumped by pump 207 through an electronic water treatment unit 324 before being directed to a solids-liquid separator 321. The electronic water treatment unit 324 is similar to electronic water treatment unit 209, though the units may have different flow capacities or signal strengths depending upon the requirements of the treatment units 210, 220 and 320.

The electronic water treatment unit 324 is a useful component in this circuit as it assists in keeping particulate suspended in the fluid, as opposed to building-up on interior surfaces of the pipes and components. By keeping particulate suspended in the fluid, the solids-liquid separator 321 may more effectively remove condensate, rather than allowing build-up of scale. As discussed above for the oil separation unit 210, 220, it is not required to include an electronic water treatment unit 324 in the solids treatment unit 320, however including an electronic water treatment unit 324 may reduce maintenance requirements and increase the amount of liquid that may be evaporated before cracking of the evaporator 370 is required.

The solids-free treated water is output from the solids-liquid separator 321 through line 15 to the make-up tank 350 for pre-heating and storage. The solids component is directed to a solids store 330, and left over water is directed through line 332 back into the solids treatment circuit. As will be appreciated, other known methods may be used to carry out the operation of solids treatment unit 320, in addition to the unit described above.

Referring back to FIG. 6a, solids treatment unit 320 and make-up tank 350 provide a solids-removal and pre-heating circuit that maintains a volume of water ready for disposal in evaporator 370. As mentioned above, the system could also operate without the make-up tank 350 or without pre-heating the water in the make-up tank 350. Use of a make-up tank 350 is preferred to allow for control over the volume of fluid in the evaporator 370. When the heat input 410 is low, then heated water may be returned to the make-up tank to reduce the volume of liquid in the evaporator 370 to maintain an optimum temperature range and evaporation rate. Similarly, when the heat input 410 is high, additional solids-free treated water may be efficiently added to the evaporator. In this way the make-up tank 350 acts as a reservoir to feed the evaporator 370 and to receive excess liquid from the evaporator 370.

Use of a make-up tank 350 is also desirable when it is necessary to "crack down" the evaporator 370 to remove scale, as illustrated in FIG. 6b. In a crack-down process the evaporator 370 is flooded with cold water which acts to break off scale. The cold water and scale may be directed through line 18 into the solids separation unit 320 for removal of the scale. The make-up tank 350 acts as a reservoir to receive the scale-free liquid while the evaporator 370 is being cracked.

As described above, holding tank 300 acts as a back-up reservoir to receive water from the evaporator 370 and the make-up tank 350 in case of overflow or maintenance needs. In an embodiment the treatment unit 200 may comprise only an oil separation unit 210 and/or 220, holding tank 300 and solids separation unit 320. In this alternate embodiment, holding tank 300 may perform some of the functions of make-up tank 350 in supplying the evaporator 370.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A method for disposing of vessel wastewater comprising:
    treating the wastewater by separating and isolating oily waste from the wastewater to produce substantially oil-free treated water and storing the separated and isolated oily waste in an oil store, and separating and isolating solids from the substantially oil-free treated water in a solids treatment unit to produce a treated water that is substantially solids-free and oil-free, storing the treated water in a make-up tank and storing the separated and isolated solids in a solids store;
    pre-heating the treated water in the make-up tank and circulating the pre-heated treated water between the solids treatment unit and the make-up tank to repeatedly separate and isolate solids from the pre-heated treated water;
    transferring the pre-heated treated water from the make-up tank to an evaporator;
    transferring heat from a heat input through an evaporation element of the evaporator to the pre-heated treated water to produce evaporation water and circulating the evaporation water between the evaporator and the make-up tank; and,
    evaporating the evaporation water from the evaporator.

2. The method of claim 1 wherein the wastewater comprises bilge water extracted from a bilge.

3. The method of claim 2 wherein the wastewater further comprises treated sewage water.

4. The method of claim 1 further comprising:
    pre-heating the treated water by transferring left-over heat from the evaporation element to a heating element in the make-up tank.

5. The method of claim 1 wherein the treatment further comprises:
    storing the substantially oil-free treated water in a holding tank and extracting the substantially oil-free treated water from the holding tank for separating and isolating solids from the substantially oil-free treated water to produce the treated water.

6. The method of claim 5 further comprising exchanging the pre-heated treated water and the evaporation water between the make-up tank and the evaporator to control a rate of evaporation.

* * * * *